324-77 CROSS REFERENCE SEARCH ROOM

Sept. 15, 1970 G. H. ROBERTSON 3,529,142
PLURAL SIGNAL PROCESSOR AND CORRELATOR
FOR FOURIER TRANSFORMED INPUTS
Filed Nov. 17, 1967 6 Sheets-Sheet 1

INVENTOR
G. H. ROBERTSON
BY A. H. MacPherson
ATTORNEY

Sept. 15, 1970 G. H. ROBERTSON 3,529,142

PLURAL SIGNAL PROCESSOR AND CORRELATOR FOR FOURIER TRANSFORMED INPUTS

Filed Nov. 17, 1967 6 Sheets-Sheet 3

United States Patent Office 3,529,142
Patented Sept. 15, 1970

3,529,142

PLURAL SIGNAL PROCESSOR AND CORRELATOR FOR FOURIER TRANSFORMED INPUTS

George H. Robertson, Summit, N.J., assignor to Bell Telephone Laboratories, Incorporated, Murray Hill, N.J., a corporation of New York Filed Nov. 17, 1967, Ser. No. 684,063
Int. Cl. G06f 7/38
U.S. Cl. 235—181 6 Claims

ABSTRACT OF THE DISCLOSURE

Signals representing selected portions of the correlation functions of many pairs of equal-length signal segments are obtained consecutively, in real time, with one correlator. The correlation function of a pair of equal-length signal segments, each signal segment composed of harmonics of the same fundamental frequency, equals the sum of a series of amplitude-adjusted cosinusoids possessing frequencies corresponding on a one-to-one basis to the harmonics of this fundamental frequency. Artificially increasing the frequencies of the cosinusoids by an amount *m*, reduces by $1/m$ the time needed to generate the selected portion of the correlation function. Thus one correlator, with appropriate multiplexing, can correlate many pairs of signal segments in real time.

BACKGROUND OF THE INVENTION

This invention relates to the correlation of two signal segments and, in particular, to the correlation, by multiplex techniques, of many pairs of signal segments in real time by a single correlator.

Two types of correlators, optical and electronic, have found wide use in signal processors. Optical correlators, which often correlate two signals recorded on separate films by integrating the light passed through the films over a wide range of relative film displacement, are inherently bulky devices. Such correlators can be made to operate in real time after a given initial delay. However, the initial delay is often longer than desired.

Electronic correlators generally store a reference signal in, for example, a recirculating delay line, and then store continuously updated segments of a received signal in another recirculating delay line. Repeatedly multiplying together the two stored signal segments and integrating the resulting product signal yields values of the correlation function for a large number of discrete relative delay or "lag" times. Again such devices operate in real time after an initial delay.

Unfortunately, both optical and electronic correlators, in the absence of special modifications, usually can correlate only a single pair of signal segments in real time. Thus, to correlate simultaneously many pairs of signal segments in real time is expensive, requiring more than one correlator, or special modifications to the existing correlator.

SUMMARY OF THE INVENTION

This invention, on the other hand, provides a correlator capable of generating in real time, after an initial delay, the correlation functions of many pairs of signal segments. Once a given pair of signal segments is obtained, a correlator constructed according to this invention yields, very rapidly, a continuous waveform representing the correlation function of the two signal segments over a selected range of relative delay times. Moreover, because the waveform representing the correlation function of two signal segments can be generated in an extremely short time, multiplexing allows one correlator to provide, in sequence, continuous waveforms representing the correlation functions of many pairs of signal segments.

As will be shown, the correlation function of two equal-length signal segments can be derived from the products of the amplitudes of like harmonic components of the two signal segments, the phase differences between like harmonic components of the two signal segments, and a set of harmonically-related pairs of sinusoids and cosinusoids. Thus, in accordance with one embodiment of this invention, the amplitudes and initial phases of the fundamental and harmonic frequency components of two equal-length signal segments are determined, in a well-known manner, by a spectral analysis system. To obtain the correlation function from this information, the products of the amplitudes of like harmonic components of the two signal segments being correlated are formed. Then each of these product terms amplitude-modulates a corresponding pair of cosinusoidal and sinusoidal signals from a set of such harmonically-related pairs. The cosinusoid and sinusoid in each pair possess a frequency corresponding to the frequency of one harmonic of the signal segments being correlated, and an instantaneous phase proportional to the lag time $\tau$ between the two signal segments. Adjusting the amplitude-modulated cosinusoid and sinusoid constituting each pair for the initial phase difference between the corresponding harmonics of the two signal segments being correlated, separately summing the resulting cosinusoids and sinusoids, and subtracting the sum of the sinusoids from the sum of the cosinusoids, produces a continuous waveform representing the correlation function of the two signal segments.

As a feature of this invention, the time necessary to generate this continuous waveform over a lag time of $\tau_{max}$ seconds is reduced to a fraction of $\tau_{max}$ by increasing the frequencies of the cosinusoidal and sinusoidal signals an appropriate amount. Thus, after an initial delay to obtain the amplitudes and phases of the harmonic components of the two signal segments being correlated, the correlation function is generated in an extremely short time. With appropriate storage and multiplexing equipment, of a type well known in the signal processing arts, the correlation apparatus of this invention can generate continuous waveforms representing the correlation functions of many different pairs of signal segments in the time now taken by current systems to generate a few discrete values of the correlation function over the same lag time range.

As another feature of this invention, the pairs of cosinusoidal and sinusoidal signals required by this invention are generated from two identical maximum-length binary sequences of pseudorandom noise stored in binary shift registers driven in opposite directions at the same rate. The harmonically-related frequency components of the two pseudorandom noise sequences are cosinusoids, approximately equal in amplitude. Like harmonics from the two noise sequences possess initial phases equal in amplitude but opposite in sign. Multiplying like harmonic components of the two pseudorandom noise sequences produces an output cosinusoid at twice the frequency of each harmonic but with zero initial phase. Delaying each cosinusoid by $\pi/2$ radians produces a sinusoid at the same frequency as the cosinusoid.

This invention may be more fully understood from the following detailed description of embodiments thereof, taken together with the following drawings.

THEORY

Figure 1:
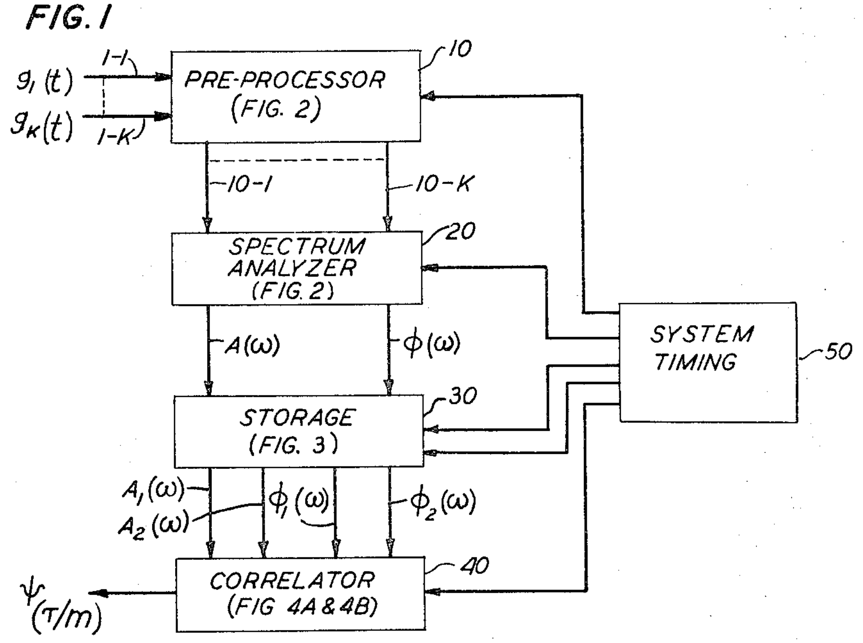
FIG. 1 is a schematic block diagram of a processing system using the principles of this invention.

The correlation function $\Phi_{12}(\tau)$ between two waveforms $g_1(t)$ and $g_2(t)$ is defined as $$\Phi_{12}(\tau)=\lim_{T\to\infty}\frac{1}{2T}\int_{-T}^{T} g_1(t)g_2(t+\tau)dt \quad (1)$$

Here $\tau$ is the relative lag time between the two waveforms, and T is a variable limit of integration. When $g_1(t)$ and $g_2(t)$ are the same signal, the correlation process is called "auto-correlation." When $g_1(t)$ and $g_2(t)$ represent different signals, the correlation process is called "cross-correlation."

In practice, $g_1(t)$ and $g_2(t+\tau)$ are often undefined for negative times and for times greater than some fixed arbitrary time T. Therefore, the correlation function $\Phi_{12}(\tau)$ is approximated as $$\Psi_{12}(\tau)=\frac{1}{T}\int_0^T g_1(t)g_2(t+\tau)dt \quad (2)$$

The Fourier transform $G(\omega)$ of a signal $g(t)$ is defined as $$G(\omega)=A(\omega)e^{j\Phi(\omega)} \quad (3a)$$

$$=\frac{1}{2\pi}\int_{-\infty}^{\infty} g(t)e^{-j\omega t}dt \quad (3b)$$

By making use of the relation $e^{-j\omega t}=\cos \omega t-j \sin \omega t$, the resulting Fourier transform can be represented as the sum of a real part $Re$ and an imaginary part $Im$. Thus $$G(\omega)=Re+jIm \quad (3c)$$

where $$Re=\frac{1}{2\pi}\int_{-\infty}^{\infty} g(t) \cos \omega t dt$$

and $$Im=-\frac{1}{2\pi}\int_{-\infty}^{\infty} g(t) \sin \omega t dt$$

In Equations $3a$, $3b$ and $3c$, $\omega$ represents frequency, in radians per second, $j=\sqrt{-1}$, $A(\omega)$, the so-called amplitude spectrum of $g(t)$, equals $\sqrt{Re^2+Im^2}$ and $\Phi(\omega)$, the so-called phase spectrum of $g(t)$, equals $\tan^{-1} Im/Re$. Since the constant $1/2\pi$ serves merely as a scale factor, it is omitted with reference to the equations in the discussion which follows.

Now by definition, $g(t)$ is zero for $t$ negative and greater than T. Thus, $g(t)$ can be considered as periodic with period T and can be represented as the sum of an infinite series of Fourier harmonics with fundamental frequency $\omega_0=2\pi/T$. This series, of course, gives $g(t)$ only for $0<t<T$. The amplitudes and phases of the harmonics in this series can be derived from the Fourier transform $G(\omega)$ of $g(t)$ by setting $\omega=n\omega_0$, where $n$, a positive integer, denotes the $n$th harmonic.

The Fourier transforms $G_1(\omega)$ and $G_2(\omega)$ of the signals being correlated, $g_1(t)$ and $g_2(t)$, respectively are $$G_1(\omega)=A_1(\omega)e^{j\Phi_1(\omega)} \quad (3d)$$

$$G_2(\omega)=A_2(\omega)e^{j\Phi_2(\omega)} \quad (3e)$$

If the signals to be correlated, $g_1(t)$ and $g_2(t)$, are each the same length, they can each be written as an infinite series of Fourier harmonics of the same fundamental frequency $\omega_0$, neglecting a D.C. component. Of course, in practice, an infinite summation is impossible but sufficiently accurate approximations to $g_1(t)$ and $g_2(t)$ are obtained by summing the first N harmonics, where N, an integer, is determined by both the lengths of the signal segments being processed and the accuracy with which it is desired to approximate $g_1(t)$ and $g_2(t)$. Thus $$g_1(t)\approx\sum_{n=1}^{N} A_1(n\omega_0) \cos [n\omega_0 t+\Phi_1(n\omega_0)] \quad (4a)$$

$$g_2(t)\approx\sum_{n=1}^{N} A_2(n\omega_0) \cos [n\omega_0 t+\Phi_2(n\omega_0)] \quad (4b)$$

Substituting Equations $4a$ and $4b$ into Equation 2, and using the theorem $$\int_0^T \cos n\omega_0\tau \cos m\omega_0\tau d\tau=0$$

when $n\neq m$, the correlation function becomes $$\Psi_{12}(\tau)=\frac{1}{T}\sum_{n=1}^{N} A_1(n\omega_0)A_2(n\omega_0)\int_0^T \cos [n\omega_0 t+\Phi_1(n\omega_0)] \times\cos [n\omega_0(t+\tau)+\Phi_2(n\omega_0)]dt \quad (5)$$

Integration reduces Equation 5 to $$\Psi_{12}(\tau)=\frac{1}{2}\sum_{n=1}^{N} A_1(n)A_2(n)\{\cos [\Phi_2(n)-\Phi_1(n)]. \cos n\omega_0\tau-\sin [\Phi_2(n)-\Phi_1(n)] \sin n\omega_0\tau\} \quad (6)$$

where the argument $n\omega_0$ has been replaced by $n$ for simplicity. Equation 6 can be written equivalently as $$\Psi_{12}(\tau)=\frac{1}{2}\sum_{n=1}^{N} A_1(n)A_2(n) \cos [n\omega_0\tau+\Phi_2(n)-\Phi_1(n)] \quad (7)$$

Equation 6 shows that the correlation function of $g_1(t)$ and $g_2(t)$ is composed of the sum of a set of amplitude-modulated cosinusoids uniformly spaced in frequency minus the sum of a set of amplitude-modulated sinusoids, likewise uniformly spaced in frequency. The fundamental frequency of both the cosinusoids and sinusoids is just the fundamental frequency $\omega_0$ of the Fourier series representations of both $g_1(t)$ and $g_2(t)$.

Equation 7 shows that equivalently, the correlation function of $g_1(t)$ and $g_2(t)$ is composed of the sum of N amplitude-modulated phase-adjusted cosinusoids uniformly spaced in frequency.

The phase, $n\omega_0\tau$, of the $n$th cosinusoid and sinusoid terms in Equation 6 is a function of $\tau$, and an interval of $\tau_{max}$ seconds is required to generate a signal representing $\tau_{max}$ seconds of the correlation function $\Psi_{12}(\tau)$. However, in accordance with this invention, the frequency $n\omega_0$ of the $n$th harmonic is increased by a factor $m$, thereby reducing the time needed to generate the terms. For example, if $m=2{,}000$, a waveform representing $\tau_{max}$ seconds of the correlation function can be generated in $\tau_{max}/2{,}000$ seconds. Thus, by making $m$ sufficiently large, the time required to generate $\tau_{max}$ seconds of the correlation function of two signal segments is reduced to a very small fraction of the time required by prior art correlators.

DETAILED DESCRIPTION

FIG. 1 shows schematically a signal processing system using the correlator of this invention. Preprocessor 10 samples a plurality of K input signals $g_1(t)$ through $g_K(t)$ detected by transducers 1–1 through 1–K, where K is a selected integer. Preprocessor 10 stores K sets of M samples each, where M is an integer, and delivers, in sequence, in response to signals from system timing 50, each of said K sets of samples to spectrum analyzer 20.

Analyzer 20 processes the M samples derived from a selected input signal and produces two continuous waveforms representing the amplitude and phase spectrums of the set of M samples. Preferably, analyzer 20 is of the type disclosed in my copending application Ser. No. 597,947, entitled "Spectrum Analyzer," filed Nov. 30, 1966 and assigned to Bell Telephone Laboratories, assignee of this application. As disclosed in that application, analyzer 20 produces signals containing the amplitude and phase information in an extremely short time, thus making possible the spectrum analysis of many sets of samples representing many signal segments, with only one spectrum analyzer. Analyzer 20 is also driven by signals from timing 50.

The amplitude and phase information produced by analyzer 20 from each set of M samples is stored in storage 30. Periodically, in response to signals from timing 50, selected amplitude and phase information representing the spectrums of two sets of samples derived from two input signals, for example, $g_1(t)$ and $g_2(t)$, is transferred from storage 30 to correlator 40.

Correlator 40, likewise controlled by signals from system timing 50, processes the spectral information received from storage 30 to produce, in a very short time, a signal $\Psi_{12}(\tau/m)$ representing $\tau_{max}$ seconds of the correlation function of the two signal segments derived from $g_1(t)$ and $g_2(t)$.

Timing system 50 controls all operations. Typically, it includes a number of separate clocks or timers, each producing pulses at a prescribed rate, together with a synchronizing system for locking all of the clocks to a common timing reference. Alternatively, as well known in the art, a single clock may be used to energize a plurality of counters, gates and the like to produce each of the timing pulse trains at the frequency needed for the several system functions. With this form of timing network, all pulses are necessarily synchronized to a common clock standard.

Figure 2:
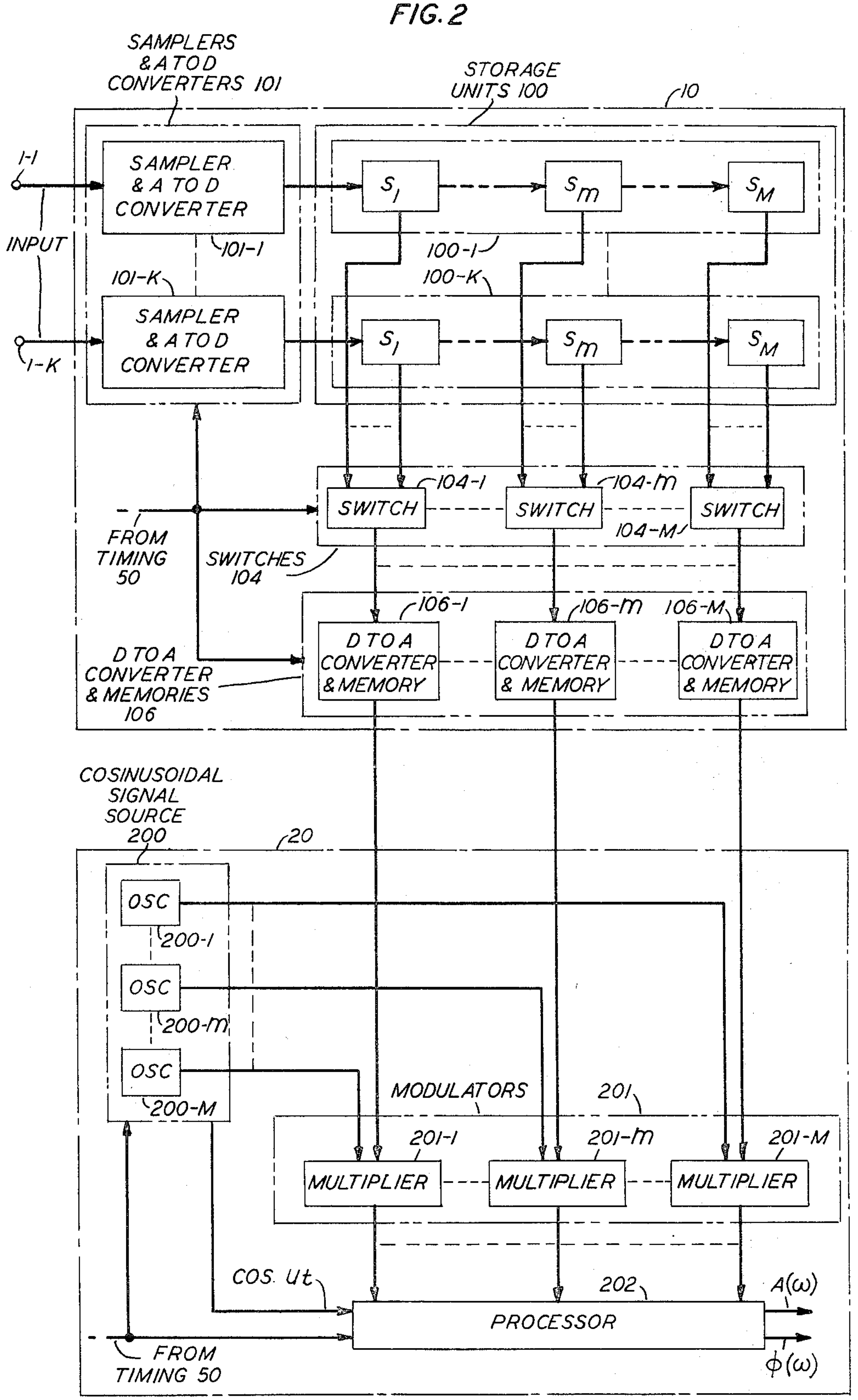
FIG. 2 is a schematic block diagram of preprocessor 10 and spectrum analyzer 20 shown in FIG. 1.

FIG. 2 shows in more detail preprocessor 10 and spectrum analyzer 20 shown in FIG. 1. A plurality of input signals, for example, acoustic signals, are detected by transducers 1–1 through 1–K. Transducers 1 convert these input signals into electrical signals which in turn are sampled by the corresponding samplers and analog-to-digital converters 101–1 through 101–K. Each sample is then converted into a binary code word by the corresponding sampler and converter. Transducers 1 and samplers and converters 101 are of well known design and thus will not be described in detail.

The binary code words representing the train of samples from each sampler and converter are then passed, in sequence, into a corresponding one of storage units 100. Unit 100–1, for example, contains a number of storage registers $S_1$ through $S_M$ where M is a selected positive integer equal to the number of samples of each signal stored. As a code word is placed in register $S_1$, the word formerly in register $S_1$ is transferred to register $S_2$. The word in register $S_2$ is transferred to register $S_3$. Similar transfer processes occur simultaneously at all registers in unit 100–1. The word in the last register $S_M$ is discarded. Thus, once an initial transition period has elapsed, unit 100–1 contains code words which represent, at any instant, the latest M samples of the signal detected by transducer 1–1. All the other storage units 100 work in a similar manner. Storage units of the type described are well known. This invention, of course, can also operate with other types of storage units.

The code words stored in unit 100–$k$ (shown symbolically only) are periodically but nondestructively transferred by means of switches 104–1 through 104–M to memories 106–1 through 106-M, where $k$ is a positive integer with a value given by $1 \leq k \leq K$. Switches 104, well known in the electronic arts, simultaneously connect the storage registers $S_1$ through $S_M$ in storage unit 100–$k$ to the corresponding memory units 106–1 through 106–M.

After a selected time, determined by a signal from system timing 50 (FIG. 1), switches 104 disconnect the registers in unit 100–$k$ from memories 106 and connect the storage registers in the next following storage unit 100–$(k+1)$ to the corresponding memory units 106–1 through 106–M. At this time, the samples formerly in these memory units are discarded and replaced by the samples in storage unit 100–$(k+1)$.

After the samples stored in unit 100–K are transferred to memories 106 and processed, switches 104 next connect the storage registers in unit 100–1 to the corresponding memories 106. This cycle repeats until stopped.

Analyzer 20, also shown in more detail in FIG. 2, processes, in sequence, sets of M samples received from memories 106 to derive the amplitude and phase spectrum of each of these sets of samples. The samples stored in memories 106 are used in multipliers 201 to adjust the amplitudes of cosine waves generated by oscillators 200. The output signals from multipliers 201–1 through 201–M are processed in processor 202, driven by reference signal cos $(ut)$ from oscillators 200, to yield the amplitude spectrum $A(\omega)$ and the phase spectrum $\Phi(\omega)$ of the set of samples stored in memories 106. A reference carrier signal, cos $(ut)$, with a frequency $u$, is developed by oscillators 200. The operation of analyzer 20 is described in detail in my above-cited copending application and thus will not further be described here.

Figure 3:
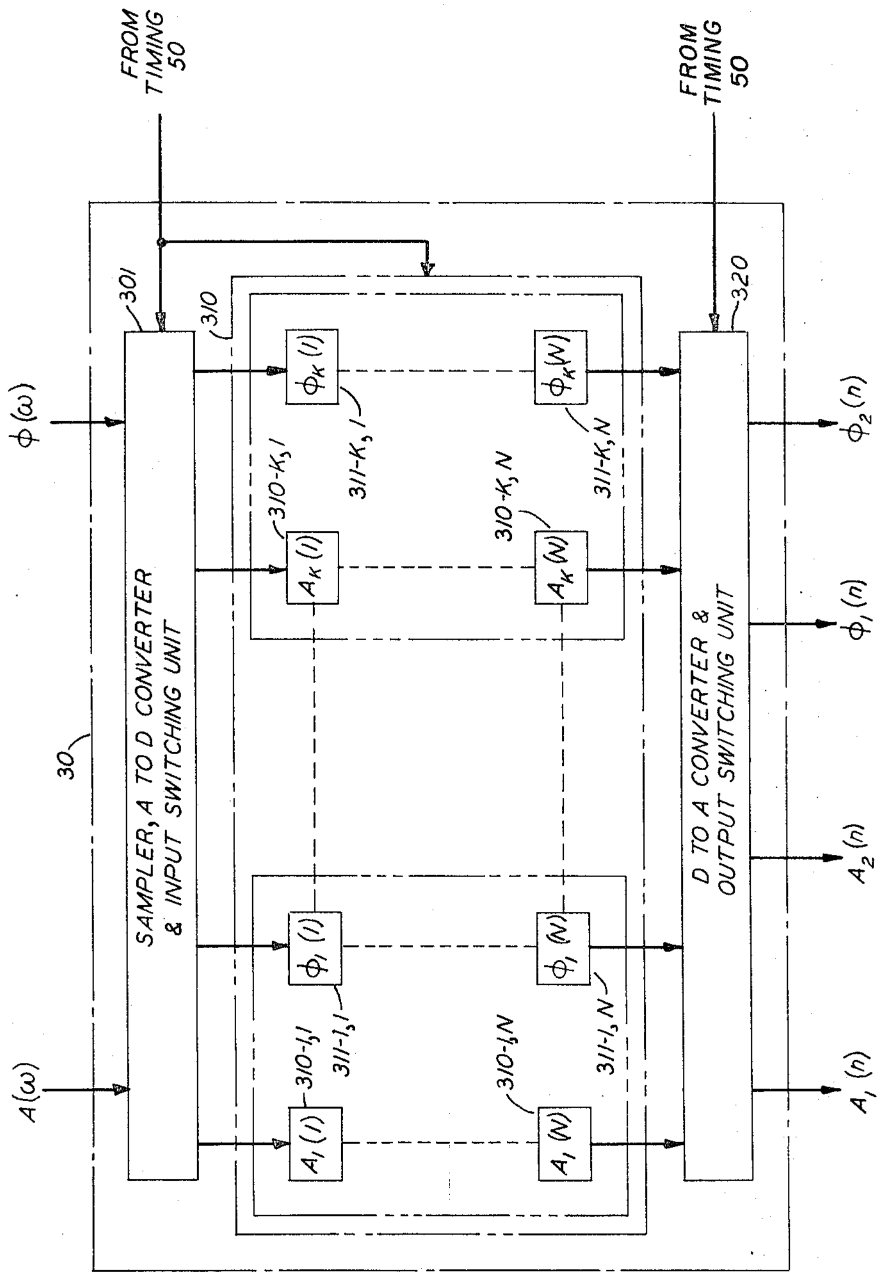
FIG. 3 is a schematic block diagram of storage 30 shown in FIG. 1.

Storage 30, shown schematically in FIG. 3, receives and stores the signals from analyzer 20 representing the amplitude and phase spectrums, $A(\omega)$ and $\Phi(\omega)$, respectively, of the sets of samples processed sequentially by analyzer 20 (FIGS. 1 and 2).

The output signals $A(\omega)$ and $\Phi(\omega)$ from analyzer 20 are analog signals. Sampler, analog-to-digital converter and input switching unit 301, controlled by signals from timing 50 (FIG. 1), samples the signals representing $A(\omega)$ and $\Phi(\omega)$ which represent the amplitude and phase of an harmonic component of the signal segment being processed. Unit 301 then converts the resulting samples into digital code words and transmits these digital code words to the proper memory units in memory 310. For example, if a signal segment derived from the signal received by the $k$th transducer in FIG. 1 is being processed, the two sets of N digital code words each, representing the amplitudes and phases of the N harmonics of this signal segment, are stored in memory units 310–$k$, 1 to 310–$k$, N and 311–$k$, 1 to 311–$k$, N, respectively. Preferably, N digit code words are read into and out of the associated memory units, e.g. 310–$k$, 1 to 310–$k$, N in stepped sequence, each new entry causing the previous entry to step along to the next memory cell. Alternatively, associated memory cells may be loaded and unloaded in response to pulses from timing unit 50.

Converter and switching unit 320 converts the digital code words representing the amplitudes and phases of the harmonic components of two signal segments, for example, the segments derived from the first and second transducers 1–1 and 1–2 (FIG. 1), into analog samples. These analog samples are then transmitted to correlator 40 which calculates their correlation function $\Psi_{12}(\tau)$. Unit 320 is such that any pair of stored signal segments can be correlated in correlator 40. Conveniently, unit 320 is prewired, or preset, in advance to supply pairs of signals, A, representative of the amplitudes of harmonic components, to product generator 422 (FIG. 4A) of correlator 40 in the order and extent required for a complete analysis of the signal segments $g_1(t)$ and $g_k(t)$ supplied to the estimator (FIG. 1). Thus, unit 320 is preadjusted in dependence on the nature of the input signal and the extent of the analysis required for a particular application. Similarly, switching unit 320 delivers pairs of signals $\Phi$ representing the phase of harmonic components to calculator 420 (FIG. 4A) of correlator 40 in the order and to the extent required for the desired analysis.

The components of storage 30 are all well known and thus will not be described in further detail. Suffice it to say that the memory units of memory 310 may, for example, comprise magnetic core storage units of a type well known in the art and described among other places in Digital Computer Components and Circuits, by R. K.

Figure 4A:
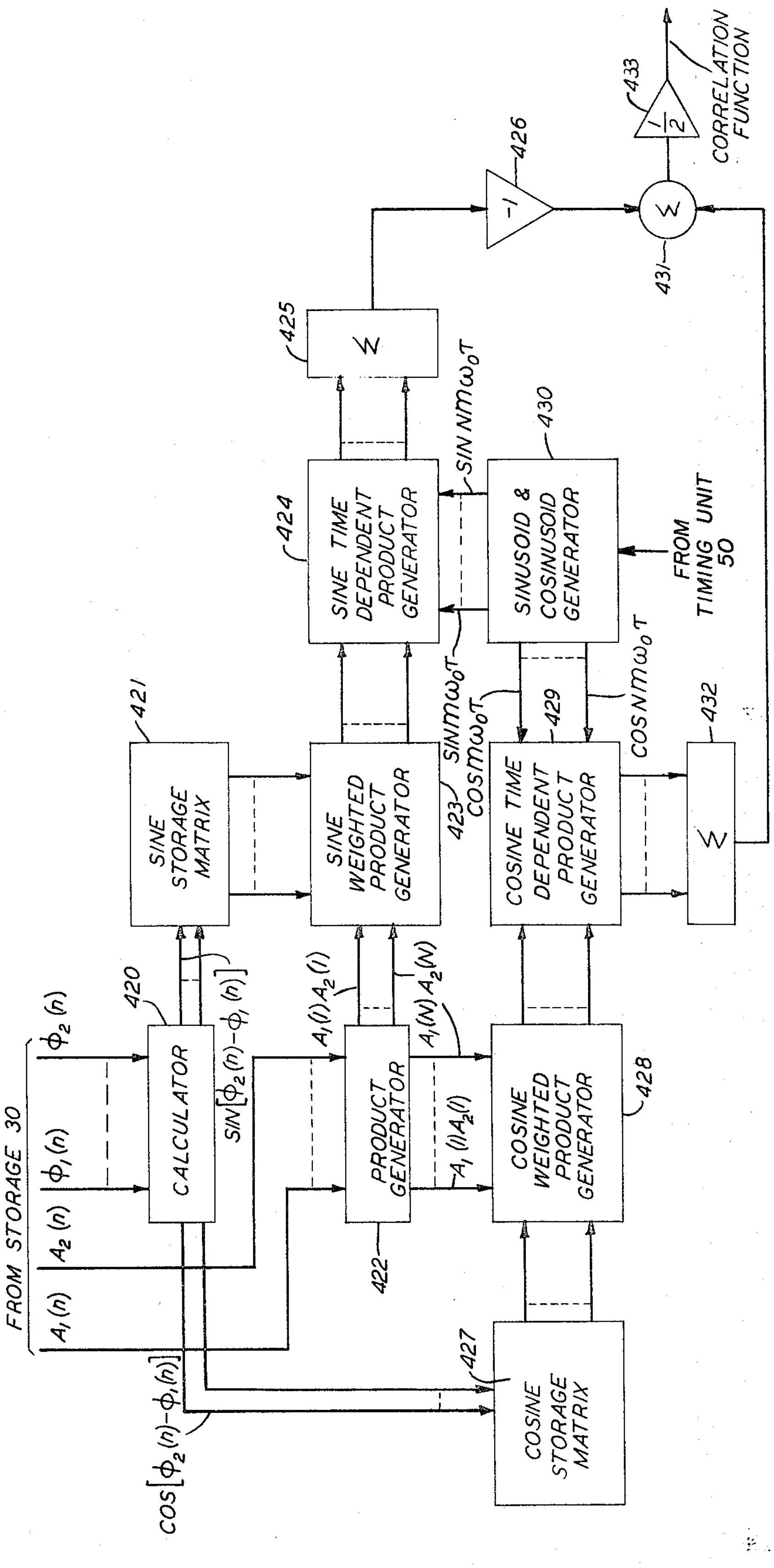
FIGS. 4A and 4B are schematic block diagrams of correlator 40 of FIG. 1.

Richards, D. Van Nostrand Co., Inc., 1957, particularly in chapter 8. Correlator 40, which produces, in sequence, the correlation functions of signal segments derived from selected pairs of input signals $g_1(t)$ through $g_K(t)$, is shown in more detail in FIG. 4A. As shown in FIG. 4A, estimates of the amplitudes $A_1(n)$ and $A_2(n)$ of the harmonic components of the signal segments derived from $g_1(t)$ and $g_2(t)$, respectively, are transferred from storage 30 (FIG. 1) to product generator 422 (FIG. 4A). Generator 422 produces output signals representing the products $A_1(1)A_2(1)$ through $A_1(N)A_2(N)$.

Signals representing the phases $\Phi_1(n)$ and $\Phi_2(n)$ of the harmonic components of the signal segments derived from $g_1(t)$ and $g_2(t)$, respectively, are in turn transferred from storage 30 to calculator 420. Calculator 420 produces sine and cosine phase signals representing both sin $[\Phi_2(n)-\Phi_1(n)]$ and cos $[\Phi_2(n)-\Phi_1(n)]$. The sine phase signals are retained in sine storage matrix 421. The cosine phase weighting signals are retained in cosine storage matrix 427. Matrices 421 and 427 essentially serve to transfer signals from calculator 420 to the following generator circuits and to assure that calculator signals are available for a sufficient time to permit product signals to be generated. Any form of analog holding circuit may be used. Alternatively a digital storage unit, as described for example in the above-cited Richards text, may be used. In this event, conventional *A/D* and *D/A* converters must of course be used.

Sine weighted product generator 423 then produces output signals $A_1(1)A_2(1)$ sin $[\Phi_2(1)-\Phi_1(1)]$ through $A_1(N)A_2(N)$ sin $[\Phi_2(N)-\Phi_1(N)]$, respectively, from the product signals produced by generator 422 and the sine phase weighting signals stored in matrix 421.

Cosine weighted product generator 428 produces product signals $A_1(1)A_2(1)$ cos $[\Phi_2(1)-\Phi_1(1)]$ through $A_1(N)A_2(N)$ cos $[\Phi_2(N)-\Phi_1(N)]$ from the product signals produced by generator 422 and the cosine phase weighting signals stored in matrix 427.

Sinusoid and cosinusoid generator 430 produces harmonically-related cosinusoidal signals cos $m\omega_0\tau$ through cos $Nm\omega_0\tau$, and harmonically-related sinusoidal signals sin $m\omega_0\tau$ through sin $Nm\omega_0\tau$. Generator 430 is actuated by pulses from timing generator 50 (FIG. 1) as discussed hereinafter in connection with FIG. 5. Accordingly, the sinusoid and cosinusoid signals produced by generator 430 correspond on a one-to-one basis with the N harmonically related frequency components of the applied signal segments. Sine time-dependent product generator 424 multiplies selected pairs of output signals from generators 423 and 430 to produce N amplitude-modulated sinusoids $A_1(1)A_2(1)$ sin $[\Phi_2(1)-\Phi_1(1)]$ sin $m\omega_0\tau$ to $A_1(N)A_2(N)$ sin $[\Phi_2(N)-\Phi_1(N)]$ sin $Nm\omega_0\tau$. Cosine time-dependent product generator 429 likewise produces N amplitude-modulated cosinusoids $$A_1(1)A_2(1)\cos[\Phi_2(1)-\Phi_1(1)]\cos m\omega_0\tau$$

to $A_1(N)A_2(N)\cos[\Phi_2(N)-\Phi_1(N)]\cos Nm\omega_0\tau$ from the signals produced by generators 428 and 430.

Summing network 425 adds output signals from product generator 424 to produce a signal proportional to the second term on the right-hand side of Equation 6. Summing network 432 adds the output signals from generator 429 to produce a signal proportional to the first term on the right-hand side of Equation 6. Amplifier 426 inverts the phase of the output signal from network 425. Network 431 adds the phase-inverted signal from amplifier 426 to the otuput signal from network 432 to produce a signal proportional to the correlation function of the two signal segments being correlated. Amplifier 433 weights the signal from network 431 by one-half to produce a signal equal to the correlation function of these two signal segments.

Because the time required to obtain the correlation function over $\tau_{max}$ seconds is reduced to $\tau_{max}/m$ seconds by increasing the frequencies of the cosinusoids and sinusoids produced by generator 430 by the factor *m*, $\tau_{max}$ seconds of the correlation function $\Psi_{12}(\tau)$ can be generated in an extremely short time.

For example, if a waveform segment is two seconds long, then its fundamental frequency is ½ cycle per second. By making the fundamental frequency of the cosinusoidal and sinusoidal signals, produced by generator 430, 1,000 cycles per second, the correlation function of two such waveform segments, for up to one second of relative delay $\tau$, can be calculated in $1/2000$ of a second. Allowing an equal time for resetting storage registers in correlator 40 (FIG. 1) and transferring data from storage 30 to correlator 40 by means of signals from timing 50, the correlation apparatus shown and described can provide, in real time after an initial delay, waveforms representing one second of the correlation functions of a thousand pairs of signal segments.

Figure 4B:
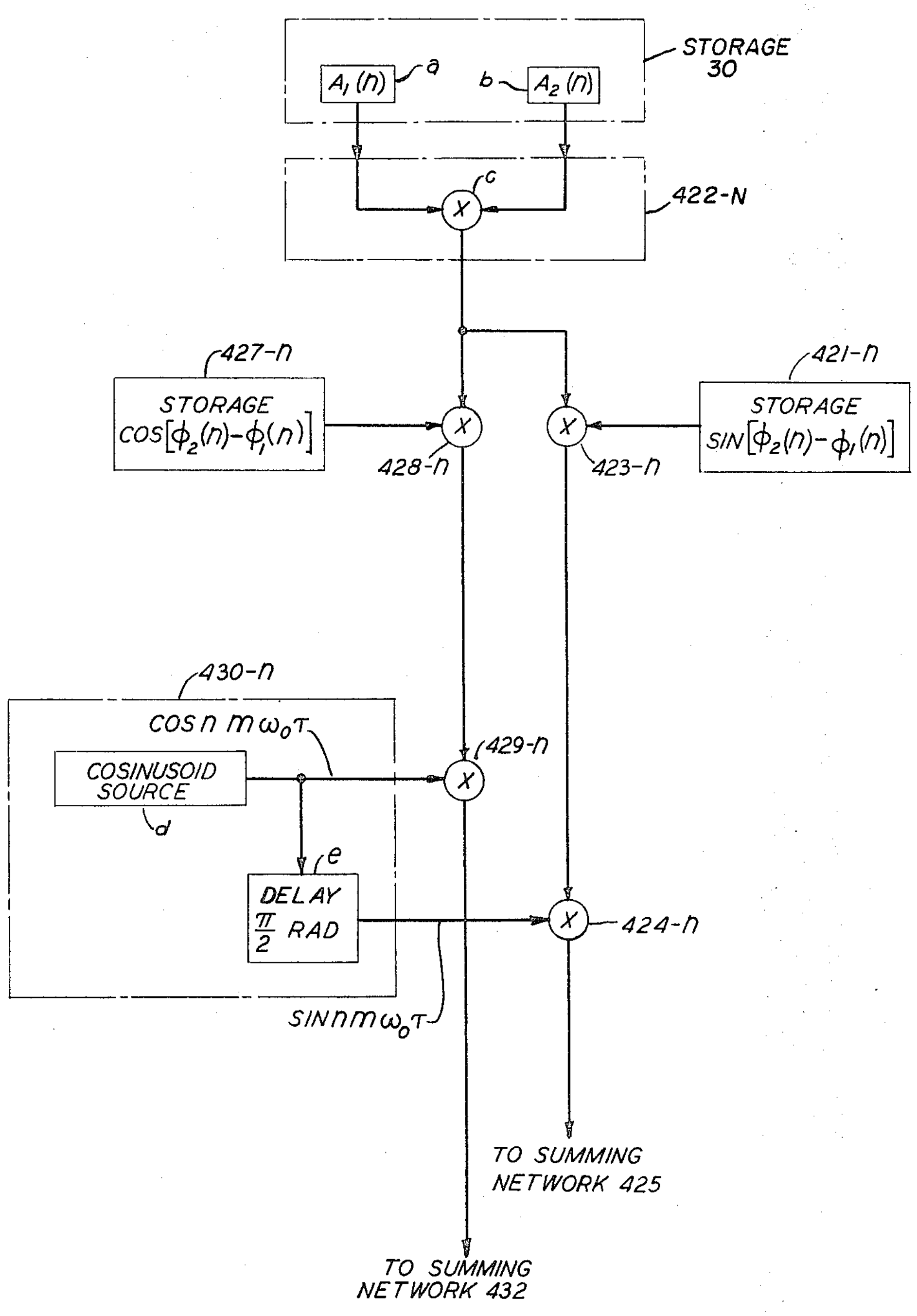

FIG. 4B shows those components of the apparatus shown in FIG. 4A which generate the *n*th amplitude-modulated sinusoid-cosinsoid pair. The apparatus required to generate the other amplitude-modulated sinusoid-cosinsoid pairs works in identical fashion.

Product generator 422–*n* is supplied with two signals from storage 30 which represent the amplitudes $A_1(n)$ and $A_2(n)$ of the *n*th harmonics of the two signal segments, $g_1(t)$ and $g_2(t)$, being correlated. A product signal proportional to $A_1(n)A_2(n)$ is produced by network *c* in generator 422–*n*. Network 428–*n* then multiplies this product signal by a signal proportional to cos $[\Phi_2(n)-\Phi_1(n)]$ from storage 427–*n*. Finally, network 429–*n* multiplies a cosinusoidal signal with instantaneous phase $nm\omega_0\tau$, from cosinusoid source *d* in product generator 430–*n*, by the signal from network 428–*n*. The result is an amplitude-adjusted cosinusoidal signal constituting one term of the first summation on the right-hand side of Equation 6.

To produce an amplitude-adjusted sinusoidal signal constituting one term of the second summation on the right-hand side of Equation 6, the product signal $A_1(n)A_2(n)$ from network *c*, in generator 422–*n*, is multiplied in network 423–*n* by a signal proportional to sin $[\Phi_2(n)-\Phi_1(n)]$ from storage 421–*n*. The resulting signal then multiplies, in network 424–*n*, a sinusoidal signal with instantaneous phase $nm\omega_0\tau$, from delay *e* in product generator 430–*n*, to produce the desired amplitude-adjusted sinusoid.

The resulting amplitude-adjusted cosinusoid and sinusoid are further processed as shown in FIG. 4A to produce, in combination with other similarly derived sinusoids and cosinusoids, a signal representing the correlation $\Psi_{12}(\tau)$ of $g_1(t)$ and $g_2(t)$.

Figure 6A:
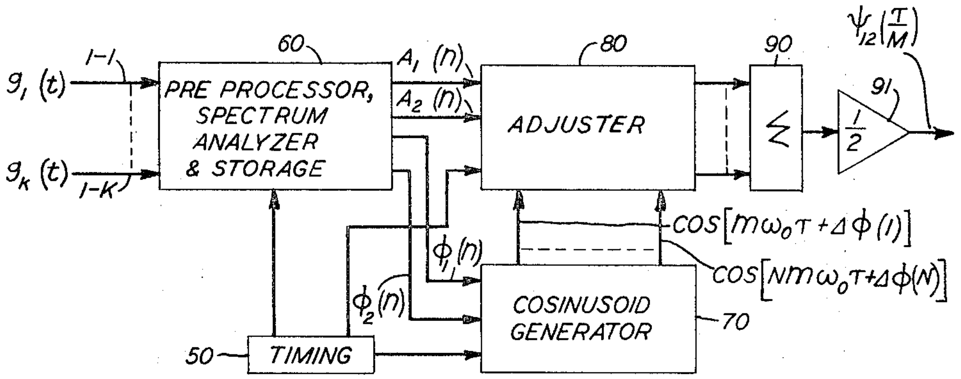
FIGS. 6A and 6B are schematic block diagrams of alternative embodiments of correlator 40, FIG. 1.

FIG. 6A shows another embodiment of this invention based on Equation 7. Preprocessor, spectrum analyzer and storage unit 60 derives the harmonic amplitudes and phase of the harmonic components of each of K signal segments derived from signals $g_1(t)$ through $g_K(t)$ detected by transducers 1–1 through 1–K. Unit 60 works in a manner identical to that of preprocessor 10, spectrum analyzer 20, and storage 30 (FIG. 1), and thus will not be described in further detail.

To obtain the correlation function of a selected pair of signal segments, for example, $g_1(t)$ and $g_2(t)$, the amplitudes of the harmonic components of these segments are transferred to appropriate storage units in adjuster 80 in response to signals from timing 50. In addition, the initial phases of these harmonic components are transferred to cosinusoid generator 70 where they are used to generate a set of harmonically-related cosinusoids each with an initial phase equal to the difference in initial phases of the corresponding harmonic components of the signal segments being correlated. Adjuster 80 then multiplies each cosinusoid from generator 70 by the product of the amplitudes of the harmonic components corresponding to that cosinusoid. The resulting amplitude-adjusted, phase-adjusted cosinusoids are summed in network 90 and amplified by one-half in amplifier 91 to produce a signal representing the correlation function $\Psi_{12}(\tau)$ of the signal segments $g_1(t)$ and $g_2(t)$.

Figure 6B:
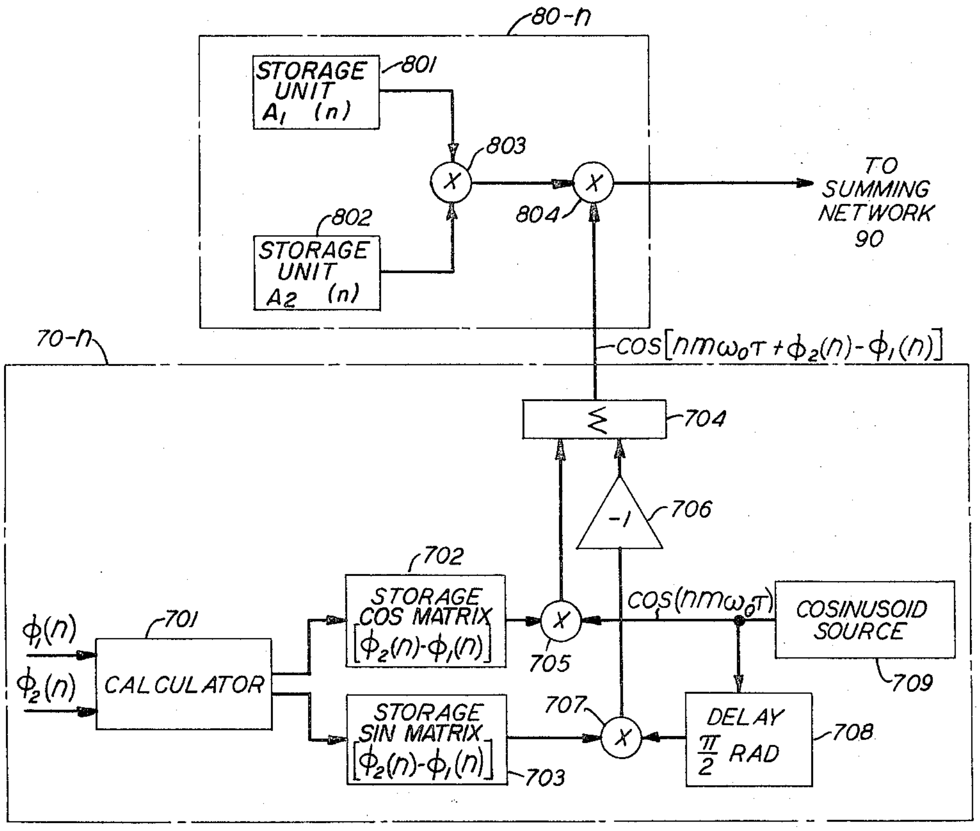

FIG. 6B shows those components of cosinusoid generator 70 and adjuster 80 shown in FIG. 6A which generate the *n*th amplitude-adjusted, phase-adjusted cosinusoid. The amplitudes $A_1(n)$ and $A_2(n)$ of the *n*th harmonics of the signal segments being correlated are stored in storage units 801 and 802, respectively. Network 803 produces a signal proportional to the product $$A_1(n)A_2(n)$$

According to Equation 7, a cosinusoidal signal, at a frequency corresponding to that of the *n*th harmonic and with an initial phase equal to the phase difference between the initial phases of the *n*th harmonics of the two signal segments being correlated, must be generated. To do this, signals representing the initial phases $\Phi_1(n)$ and $\Phi_2(n)$ of the *n*th harmonics of the signal segments being correlated are transferred from unit 60 to calculator 701. Calculator 701 produces output signals representing both the cosine and the sine of this phase difference. These signals are stored in storage units 702 and 703, respectively. Cosinusoid source 709 which might, for example, be either an oscillator or, as will be described later, apparatus for obtaining one frequency component from specially generated pseudorandom noise sequences, produces an output signal cos $nm\omega_0\tau$. Delay 708 produces an ouput signal sin $nm\omega_0\tau$ by delaying the cosinusoid from source 709 by $\pi/2$ radians.

Network 705 multiplies the cosinusoid from source 709 by the cosine signal from storage 702. Network 707 multiplies the sinusoid from delay 708 by the sine signal from storage 703. Amplifier 706 inverts the phase of the product signal from network 707 and network 704 sums the output signals from network 705 and amplifier 706 to produce the cosinusoid cos $[nm\omega_0\tau+\Phi_2(n)-\Phi_1(n)]$. Network 804 multiplies the product signal from network 803 with this cosinusoid to produce the *n*th amplitude-adjusted cosinusoid in the summation term on the right-hand side of Equation 7. This amplitude-adjusted cosinusoid is sent to network 90, FIG. 6A, where it is added to other similarly derived cosinusoids to produce a signal representing the correlation function $\Psi_{12}(t)$ of $g_1(t)$ and $g_2(t)$.

APPARATUS FOR GENERATING COSINUSOID-SINUSOID PAIRS

Figure 5:
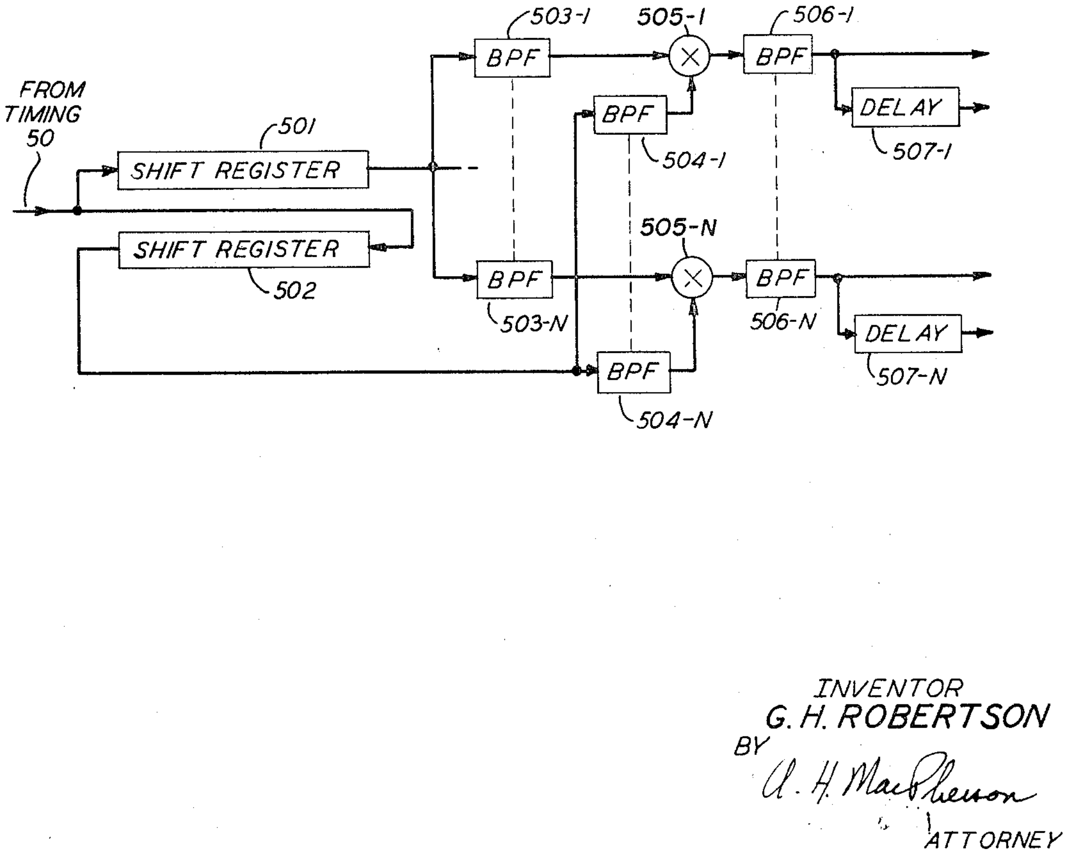
FIG. 5 is a schematic block diagram of the apparatus for generating pairs of cosinusoidal and sinusoidal signals.

FIG. 5 shows one method of generating the N cosinusoids required for use in correlator 40 (FIGS. 1, 4A, and 4B) or in the correlation apparatus shown in FIGS. 6A and 6B. Shift registers 501 and 502 each produce sequences of binary pulses in pseudorandom order. Both registers are internally wired according to a suitable pseudorandom code and are driven by clock pulses from timing system 50, but in opposite directions, thus to produce an analog waveform, restricted to two amplitude levels. Suitable registers for this application are described in Shift Register Sequences, by S. W. Golomb, Holden-Day, 1967, and in Error Correcting Codes, W. W. Peterson, M.I.T. Press, 1961. Because shift registers 501 and 502 are of finite and equal lengths, the output signals read out from both registers repeat synchronously and periodically. Each output signal can thus be represented in the frequency domain by an infinite series of harmonically-related frequency components possessing the fundamental frequency $\omega'$. Letting the forward driven sequence be denoted by $p(+t)$ and the backward driven sequence be denoted by $p(-t)$, these two sequences can be represented mathematically, in complex notation, as the real part of the following equations:

$$p(+t)=Re\sum_{n=0}^{\infty}P_+(n\omega')e^{jn\omega' t} \tag{8a}$$

$$p(-t)=RE\sum_{n=0}^{\infty}P_-(n\omega')e^{jn\omega' t} \tag{8b}$$

In Equations 8*a* and 8*b*, R*e* means "real part," $P_+(n\omega)$ and $P_-(n\omega)$ are the values of the Fourier transforms of the forward driven and the backward driven pseudorandom noise sequences, respectively, at the *n*th harmonics, and *n* is a summing index denoting the harmonic number.

It is well known that if the Fourier transform of the forward driven pseudorandom noise is given by Equation 9*a*, $$P_+(\omega)=A(\omega)e^{j\Phi(\omega)} \tag{9a}$$

then the Fourier transform $P_-(\omega)$ of the backward driven pseudorandom noise is given by Equation 9*b*, $$P_-(\omega)=A(-\omega)e^{j\Phi(-\omega)} \tag{9b}$$

By using the fact that the amplitude spectrum $A(\omega)$ is, by definition, an even function, while the phase spectrum $\Phi(\omega)$ is by definition an odd function [see the definitions of $A(\omega)$ and $\Phi(\omega)$, following Equation 3*c*], Equation 9*b* becomes $$P_-(\omega)=A(\omega)e^{-j\Phi(\omega)} \tag{9c}$$

Substituting Equations 9*a* and 9*c* into Equations 8*a* and 8*b*, respectively, gives, for the forward driven and backward driven pseudorandom noise sequences, the following expressions:

$$P(+t)=Re\sum_{n=0}^{\infty}A(n\omega')e^{j\Phi(n\omega')}e^{jn\omega' t} \tag{10a}$$

$$P(-t)=Re\sum_{n=0}^{\infty}A(n\omega')e^{-j\Phi(n\omega')}e^{jn\omega' t} \tag{10b}$$

Thus $p(+t)$ and $p(-t)$ are each composed of at least N harmonics of the same fundamental frequency. Moreover, the initial phases $\Phi(n\omega')$ of like harmonic components of the two signals are equal in amplitude but opposite in sign.

By filtering $p(+t)$ by a series of N bandpass filters 501–1 through 503–N, each with a center frequency corresponding to a selected one of the first N harmonic components of $p(+t)$, the first N harmonic components of $p(+t)$ are effectively separated from each other. Each filter, of course, has a bandwidth such that it passes only the corresponding frequency component of $p(+t)$. Likewise, bandpass filters 504–1 through 504–N similarly isolate the first N harmonic components of $p(-t)$. Like harmonic components of the two oppositely driven maximum length pseudorandom noise sequences are then multiplied together in a corresponding one of product networks 505–1 through 505–N. The output signal $c_n(t)$ from the *n*th product network **505–*n***, given by Equation 11, $$c_n(t)=\frac{1}{2}A^2(n\omega')[\cos 2n\omega' t+\cos 2\Phi(n\omega')] \tag{11}$$

is a cosinusoidal signal of frequency $2n\omega'$ and with zero initial phase. Thus, the output signals from networks 505–1 through 505–N, when passed through a corresponding one of bandpass filters 506–1 through 506–N to remove the D.C. component, are a series of uniform-amplitude, harmonically-related cosinusoids each possessing zero initial phase. A comparison of Equations 6 and 11 shows that these cosinusoids can be used as the cosinusoidal signals required by the correlator of this invention by making $\omega'=m\omega_0/2$. Delaying each cosinusoid by $\pi/2$ radians in a corresponding one of delays 507–1 through 506–N produces a set of uniform-amplitude, harmonically-related sinusoids.

Other apparatus incorporating the principles of this invention will be apparent to those skilled in signal processing. In particular, while apparatus has been described for generating the first $\tau_{max}$ seconds of the correlation function, those skilled in signaling processing will recognize that any segment of the correlation function of a pair of signal segments can be generated by appropriately setting the initial phases of the cosinusoids and sinusoids used in the correlator of this invention.

What is claimed is:

1. Apparatus which comprises means responsive to input signals for deriving signals representative, respectively, of the amplitudes and initial phases of two sets of N harmonically-related frequency components, each set representing one of a pair of signal segments, where N is a selected positive integer, means operating synchronously with said deriving means for generating N harmonically-related cosinusoidal signals corresponding on a one-to-one basis to the N harmonically-related frequency components in each of said two sets, each cosinusoidal signal possessing a specified initial phase, means responsive to said cosinusoidal signals for amplitude-adjusting each of said N cosinusoidal signals with a signal proportional to the product of the amplitudes of the corresponding frequency components of said pair of signal segments, and means responsive to said amplitude adjusted signals for summing said amplitude-adjusted cosinusoidal signals to produce a continuous signal representing $\tau_{max}$ seconds of the correlation function of said pair of signal segments.

2. Apparatus as in claim 1 in which said means for generating produces N harmonically-related cosinusoidal signals corresponding on a one-to-one basis to the N harmonically-related frequency components in each of said two sets, each cosinusoidal signal possessing an initial phase equal to the difference in phase between the corresponding harmonic frequency components of said pair of signal segments.

3. Apparatus for correlating a pair of equal-length signal segments, each signal segment being composed of N harmonics of the same fundamental frequency, the $n$th harmonic possessing an amplitude $A(n)$ and an initial phase $\Phi(n)$, where N and $n$ are selected positive integers, $n$ being given by $1 \leq n \leq N$, which comprises, means responsive to successive pairs of said cosinusoidal signals for generating N pairs of uniform-amplitude cosinusoidal signals and sinusoidal signals, said pairs possessing harmonically-related frequencies, means responsive to successive pairs of said sinusoidal signals for multiplying each of said cosinusoidal signals by a signal representing $A_1(n)A_2(n)\cos[\Phi_2(n)-\Phi_1(n)]$, where the subscripts 1 and 2 denote the two signal segments being correlated, and where $n$ denotes the $n$th of said N cosinusoidal signals, to produce a first product signal, means for multiplying each of said sinusoidal signals by a signal representing $$A_1(n)A_2(n)\sin[\Phi_2(n)-\Phi_1(n)]$$

to produce a second product signal, means responsive to said first product signal for summing all of said multiplication product cosinusoidal signals to produce a first sum signal, means responsive to said second product signals for summing all of said multiplication product sinusodial signals to produce a second sum signal, and means for producing, from said first and second sum signals, an output signal representing a selected portion of the correlation function of said pair of equal-length signal segments.

4. Apparatus as in claim 3 in which said means for generating N pairs of uniform-amplitude cosinusoidal signals and sinusoidal signals comprises, means for storing a sequence of binary pulses in pseudorandom order, means for generating from said sequence two intermediate signals, one by repetitively reading out said sequence in a first, forward direction, and the other by repetitively reading out said sequence in a second, backward direction, each of said two intermediate signals being composed of substantially uniform-amplitude, harmonically-related frequency components, and means for producing from said two intermediate signals, said N pairs of cosinusoidal signals and sinusoidal signals.

5. Apparatus as in claim 4 in which said means for producing comprises a first set of N bandpass filters for isolating each of the first N harmonics of one of said two intermediate signals, said filters possessing center frequencies corresponding on a one-to-one basis to the frequencies of the first N uniform-amplitude, harmonically-related components of one of said two intermediate signals, a second set of N bandpass filters for isolating each of the first N harmonic components of the other of said two intermediate signals, said filters possessing center frequencies corresponding on a one-to-one basis to the frequencies of the first N uniform-amplitude, harmonically-related components of the other of said two intermediate signals, N product networks, each network producing an output signal proportional to the product of a corresponding pair of like harmonic components of said two intermediate signals, a third set of N bandpass filters, each filter passing only the alternating component of a corresponding one of the N output signals from said N product networks, thereby to produce N harmonically-related cosinusoidal signals each with zero initial phase, and means for delaying each of said N cosinusoidal signals by $\pi/2$ radians, thereby to generate N harmonically-related, uniform-amplitude cosinusoidal signals.

6. Apparatus as in claim 3 in which said means for producing comprises means for subtracting said second sum signal from said first sum signal to produce a difference signal, and means for amplifying said difference signal by one-half, to produce said output signal representing a selected portion of the correlation function of said pair of equal-length signal segments.

References Cited

UNITED STATES PATENTS

| | | | |
|---|---|---|---|
| 3,087,674 | 4/1963 | Cunningham et al. | 235—181 |
| 3,096,479 | 7/1963 | Marks et al. | 324—77 |
| 3,217,251 | 11/1965 | Andrew | 324—77 |
| 3,359,409 | 12/1967 | Dryden | 235—181 |
| 3,403,343 | 9/1968 | Kelly | 328—17 |

MALCOLM A. MORRISON, Primary Examiner

F. D. GRUBER, Assistant Examiner

U.S. Cl. X.R.

235—150.53, 197; 324—77; 328—17